US007508233B2

(12) United States Patent
Lin et al.

(10) Patent No.: US 7,508,233 B2
(45) Date of Patent: Mar. 24, 2009

(54) FULL-ADDER OF COMPLEMENTARY CARRY LOGIC VOLTAGE COMPENSATION

(75) Inventors: Jin-Fa Lin, Chiayi County (TW); Yin-Tsung Hwang, Yunlin County (TW); Ming-Hwa Sheu, Yunlin County (TW); Cheng-Che Ho, Taipei (TW)

(73) Assignee: National Yunlin University of Science and Technology, Yunlin County (TW)

( * ) Notice: Subject to any disclaimer, the term of this patent is extended or adjusted under 35 U.S.C. 154(b) by 0 days.

(21) Appl. No.: 11/699,971

(22) Filed: Jan. 31, 2007

(65) Prior Publication Data

US 2008/0183784 A1 Jul. 31, 2008

(51) Int. Cl.
*H03K 19/173* (2006.01)
*G06F 7/38* (2006.01)

(52) U.S. Cl. .......................... 326/38; 708/703; 708/714

(58) Field of Classification Search ......... 708/700–714; 326/38

See application file for complete search history.

(56) References Cited

U.S. PATENT DOCUMENTS

| | | | | |
|---|---|---|---|---|
| 5,818,747 | A * | 10/1998 | Wong | 708/702 |
| 6,473,529 | B1 * | 10/2002 | Lin | 382/236 |
| 6,904,447 | B2 * | 6/2005 | Rhee | 708/703 |
| 7,157,934 | B2 * | 1/2007 | Teifel et al. | 326/38 |
| 7,290,026 | B2 * | 10/2007 | Gonzalez | 708/700 |

OTHER PUBLICATIONS

Ahmed M. Shams et al., A novel high-performance CMOS 1-bit full adder cell, IEEE Transactions on Circuit and Systems- II: Analog and Digital Signal Processing, vol. 47, No. 5, May 2000, pp. 478-481.

Nan Zhuang et al., A new design of the CMOS full adder, IEEE Journal of Solid-State Circuits, vol. 27, No. 5, May 1992, pp. 840-844.

Hung Tien Bui et al., Design and analysis of low-power 10-transistor full adders using novel XOR-XNOR gates, IEEE Transactions on Circuits and Systems-II: Analog and Digital Signal Processing, vol. 49, No. 1, Jan. 2002, pp. 25-30.

R. Shalem et al., Proc. Great Lakes Symp. VLSI, A novel low power energy recovery full adder cel, 1999, pp. 380-383.

* cited by examiner

*Primary Examiner*—Rexford Barnie
*Assistant Examiner*—Crystal L Hammond
(74) *Attorney, Agent, or Firm*—Muncy, Geissler, Olds & Lowe, PLLC

(57) ABSTRACT

In a full-adder of complementary carry logic voltage compensation, two input terminals of a first multiplexer are connected to a carry input and a carry inverted phase input respectively; an add signal is connected to a select signal; an input terminal of a first inverter is connected to an output signal of the first multiplexer. Two input terminals of a second multiplexer output an addend and a summand; an output signal of the first inverter is selected; an output terminal of the second multiplexer produces a carry signal; an input terminal of the second inverter is connected to an output signal of the second multiplexer for producing a carry inverted phase signal; two input terminals of a third multiplexer input the summand and carry inverted phase signal; an output signal of the first inverter is a select signal; and an output terminal of the third multiplexer produces a sum signal.

7 Claims, 5 Drawing Sheets

A
XNOR
11
21
$C_{in}$
in0 sel
out
$\overline{C_{in}}$
in1
13
in1 sel
out
Sum
in0
12
22
in1 sel
out
$\overline{C_{out}}$
B
in0
$C_{out}$

| Input | | | | Selection | | Output | | |
|---|---|---|---|---|---|---|---|---|
| A | $C_{in}$ | $\overline{C_{in}}$ | B | $A \oplus C_{in}$ | $A \odot C_{in}$ | Sum | $C_{out}$ | $\overline{C_{out}}$ |
| 0 | 0 | 1 | 0 | 0 | 1 | 0 | 0 | 1 |
| 0 | 0 | 1 | 1 | 0 | 1 | 1 | 0 | 1 |
| 0 | 1 | 0 | 0 | 1 | 0 | 1 | 0 | 1 |
| 0 | 1 | 0 | 1 | 1 | 0 | 0 | 1 | 0 |
| 1 | 0 | 1 | 0 | 1 | 0 | 1 | 0 | 1 |
| 1 | 0 | 1 | 1 | 1 | 0 | 0 | 1 | 0 |
| 1 | 1 | 0 | 0 | 0 | 1 | 0 | 1 | 0 |
| 1 | 1 | 0 | 1 | 0 | 1 | 1 | 1 | 0 |

Fig. 2

FULL-ADDER OF COMPLEMENTARY CARRY LOGIC VOLTAGE COMPENSATION

FIELD OF THE INVENTION

The present invention relates to a full-adder circuit design, and more particularly to a full-adder circuit featuring a high speed, a low power consumption, a low operating voltage and a high driving capability.

BACKGROUND OF THE INVENTION

In general, the design of a full-adder is usually simplified by a Karnaugh map, and the simplified result is applied directly to the design of full-adders. However, the voltage of output signals of a circuit will be lost, if the transistor count of such design drops to a minimum of 10 transistors (10T). Particularly, the loss occurred in an application of a serially connected multi-bit adders becomes very important, because the signals may have to be transmitted from the lowest bit to the highest bit in the worst scenario of a serial connection. Therefore, a lower signal driving capability will significantly affect the overall performance of the speed of the whole circuit and consume more power.

A loss of output potential generally occurs at a circuit structure for lowering its transistor count, and a pass transistor logic is used to implement the circuit structure, and thus there will be a loss of potential of an output voltage under certain specific conditions, and this problem is known as a "threshold loss" problem. In a negative-channel metal oxide semiconductor (NMOS), a high signal is transmitted when the NMOS transistor is turned on, and the voltage (Vdd−Vtn) of its output signal will be lost by one Vtn, wherein Vtn is a NMOS-threshold voltage (typically having a value of 0.6~0.8V for the 0.35 um process, if the cost-effectiveness of the substrate is taken into account). In other words, the electric potential of the output is not equal to the operating voltage, but it has a voltage equal to one Vtn smaller than the operating voltage. The same problem occurs in a positive-channel metal oxide semiconductor (PMOS), and if the PMOS transmits a low electric potential, the voltage of the output signal will be one Vtp greater than the electric potential, wherein Vtp is the PMOS-threshold voltage (which typically has a value of −0.7~−0.95V, if the cost-effectiveness of the substrate is taken into account for the 0.35 um process). In other words, the outputted electric potential is not equal to the operating voltage, but the voltage is one Vtp greater than the operating voltage. To solve this problem, an inverter is usually added to the circuit structure to provide a complementary control signal. In the meantime, a PMOS and an NMOS are used for transmitting signals and they are known as transmission gates as described in [A. Shams and M. Báyoumi, "A Novel High-Performance COMS 1-Bit Full-Adder Cell" IEEE Trans. Circuits and Systems-II, Vol. 47 No. 5, May 2000.] [N. Zhuang and H. Wu, "A New design of the CMOS full-adder," IEEE J. of Solid state circuits, Vol. 27, No. 5, pp. 840-844, May 1992.]. However, all of these also cause an overall increase of the transistor count and the silicon area and increase the power consumption.

If a circuit structure uses a MOS as a switch component and such switch is used for a serial connection, there will be a signal transmission delay, and the speed of the signal transmission and the number of levels (N) of the serial connection have a loss proportional to the number of levels in square ($N^2$) provided that the serially connected switches have not used a buffer or an inverter for the division and compensation, and this phenomenon is called an "Elmore Delay". Although the aforementioned adder having a high transistor count can overcome the threshold loss problem of the threshold voltage, yet the Elmore delay problem still exists.

However, there are more than 40 present designs of ten-transistor (10T) full-adders as disclosed by [Hung Tien Bui, Yuke Wang and Yingtao Jiang; "Design and analysis of low-power 10-transistor full-adders using novel XOR-XNOR gates" IEEE Transactions on Systems II: Express Briefs, Volume: 49, Issue: 1, pp. 25-30. January 2002] and [R. Shalem, E. John, and L. K. John, "A novel low power energy recovery full-adder cell," in Proc. Great Lakes Symp. VLSI, pp. 380-383, 1999], and the potential of the output signal has a multi-threshold loss, in addition to the loss of two times of Vt (2Vtn+Vtp or 2Vtp+Vtn). The multi-threshold loss of the threshold voltage causes a more serious Elmore delay for driving a serial connection in a ten-transistor full-adder design, and its operating voltage cannot be lower than 2.8V (for a 0.35 um fabrication process), and thus greatly lowering the practicability of adders of this sort.

An adder composed of ten transistors (10T) definitely has advantages on its layout area, but finding a way of maintaining a high performance and a lower operating voltage in such design with a very low transistor count is facing a severe challenge. As to the static energy-recovery full-adder (SERF) having the best performance in a 10T design, the SERF circuit structure as shown in FIG. 1 is taken for example, and its formula based on the algorithm of the full-adder is $Sum=(A \odot B).C_{in}+(A \oplus B).\overline{C_{in}}$; $C_{out}=(A \oplus B).C_{in}+(A \odot B).A$. If a primary XNOR logic block 1 inputs an addend A and a summand B and whose potentials are high (A=1, B=1), the two PMOS transistors at the top will be off, and the output Q1 of the primary XNOR logic block 1 can be obtained from the two NMOS transistors at a high potential from the bottom. Since there is a threshold loss of the voltage loss problem if the NMOS transistor transmits a high potential, therefore the maximum potential can reach up to Vdd−Vtn. This output controls a transistor gate of a logic circuit such as a secondary XNOR logic block 2 for finally producing a sum output Sum and a 2-to-1 multiplexer 3 for producing a carry output $C_{out}$. In addition, the voltage loss occurs at the secondary XNOR logic block 2 and the NMOS transistor in the 2-to-1 multiplexer 3, and the maximum potential of their carry output $C_{out}$ can reach up to Vdd−2Vtn, and their minimum potential can rise up to |Vtp| due to the voltage loss of the PMOS transistor in the 2-to-1 multiplexer 3, so that the final output has a multi-threshold voltage loss problem.

The same situation may occur in other disclosed ten-transistor full-adders, and thus the operating voltage of the current 10T full-adders cannot be too low, and the operating voltage cannot be lower than 2Vtn+|Vtp| (or 2|Vtp|+Vtn), or else the full-adders cannot be used in a circuit operated at a low voltage. In addition, a general adder usually uses a plurality of bits connected in series for its application, and thus a transmission with a carry output should be taken into consideration. Under the situation of such circuit having a carry output potential with a poor driving capability, the performance of the serial connection will be not as good. In addition, such design also causes an Elmore delay in a serial connection and results in a low performance, so that the present 10T full-adders have difficulties in their applications. These two drawbacks severely affect the performance of a serial connection.

To solve the foregoing problems, some prior arts use more transistors. In other words, there will be no such problem if both PMOS and NMOS transmit signals at the same time, and this structure is called a transmission gate. For instance, if the aforementioned pass transistor logic uses one NMOS transistor, the structure of the transmission gate will require another inverter (2T) in addition to the use of MOS and PMOS, and thus the transmission gate actually has three more transistors than the pass transistor logic. In other words, the transmission gate cannot be used with the limitation often transistors (10T).

The aforementioned structure still has the Elmore delay problem when the MOS transistor is used for transmitting signals (simultaneously using one NMOS or PMOS or two MOS for the transmission), except that no loss of potential occurs in the transmission gate structure. In addition, the PMOS and the NMOS are connected in parallel while transmitting signals, and thus the resistance of an equivalent transmission is smaller, and the influence of the Elmore effect will become lesser.

In summation of the description above, the present 10T full-adder has two major problems: 1. A multi-threshold loss problem that maintains the operating voltage of a full-adder at a level which is not too low. 2. A serious Elmore delay that causes a low performance and makes the application of the present 10T full-adder very difficult.

Although the design of other full-adders having a higher transistor count can solve the foregoing problem, the design adopts 16~28 transistors or even more and thus incurring an additional design cost as well as increasing the manufacturing cost for the additional transistors.

SUMMARY OF THE INVENTION

A primary objective of the present invention is to overcome the foregoing shortcomings and avoid the existing deficiencies by providing a full-adder circuit structure that makes the applications of a serial connection more practical without using an additional compensation circuit to maintain a certain level of performance for the applications of a serial connection, so as to reduce the complexity of the design and the waste of costs.

A full-adder of a complementary carry logic voltage compensation of the present invention comprises a first multiplexer having two input terminals for inputting a carry input and a carry inverted phase input respectively, and a select terminal for inputting an add signal; a first inverter having an input terminal connected to an output signal of the first multiplexer; a second multiplexer having two input terminals for inputting an addend and a summand respectively, a select terminal for inputting an output signal of the first inverter, and an output terminal of the second multiplexer for producing a carry signal; a second inverter having an input terminal connected to a carry inverted phase signal produced by an output signal of the second multiplexer; and a third multiplexer having two input terminals for inputting the summand and the carry inverted phase signal produced by the second inverter respectively, and a select terminal for inputting an output signal of the first inverter, and an output terminal of the third multiplexer for producing a sum signal.

The first, second and third multiplexers adopt two transistors for the switch components: a PMOS transistor used as a switch of a first input terminal and an NMOS transistor uses as a switch of a second input terminal.

If a first input terminal of the first multiplexer is connected to the carry input and a second input terminal of the first multiplexer is connected to the carry inverted phase input, an output signal of the first multiplexer will be inverted by the first inverter to form a XNOR logic circuit, and a first input terminal of the second multiplexer is connected to the summand, and a second input terminal of the second multiplexer is connected to the addend; and a first input terminal of the third multiplexer is connected to the second inverter to produce a carry inverted phase signal, and a second input terminal of the third multiplexer is connected to the summand.

If a first input terminal of the first multiplexer is connected to the carry inverted phase input, and a second input terminal of the first multiplexer is connected to the carry input, an output signal of the first multiplexer will be inverted by the first inverter to form a XOR logic circuit, and a first input terminal of the second multiplexer is connected to the addend, and a second input terminal of the second multiplexer is connected to the summand; and a first input terminal of the third multiplexer is connected to the summand, and a second input terminal of the third multiplexer is connected to the second inverter to produce a carry inverted phase signal.

Therefore, the present invention provides a novel circuit structure of a 10T full-adder capable of adding two inverter circuits successfully into a full-adder circuit structure and along the carry transmission path without increasing the transistor count, so as to reduce the loss of potential of the output signals of the ten-transistor full-adder, and the loss of two times of Vt for achieving a correct logic operation can be reduced to a loss of one time of Vt.

As to the serial connection, the circuit structure of the present invention in a critical path of the carry signal transmission does not have a long serial connection of a pass transistor logic, since the inverter in the circuit structure is situated precisely on the critical path of the carry transmission, and thus an inverter is connected after each signal transmission to prevent the switch at a next level from being transmitted directly, so as to solve the Elmore delay problem and recover the loss of electric potential of a previous switch at a certain specific condition.

BRIEF DESCRIPTION OF THE DRAWINGS

FIG. 2 is a truth table applicable for all ten-transistor (10T) adders;

DETAILED DESCRIPTION OF THE PREFERRED EMBODIMENTS

Figure 1:
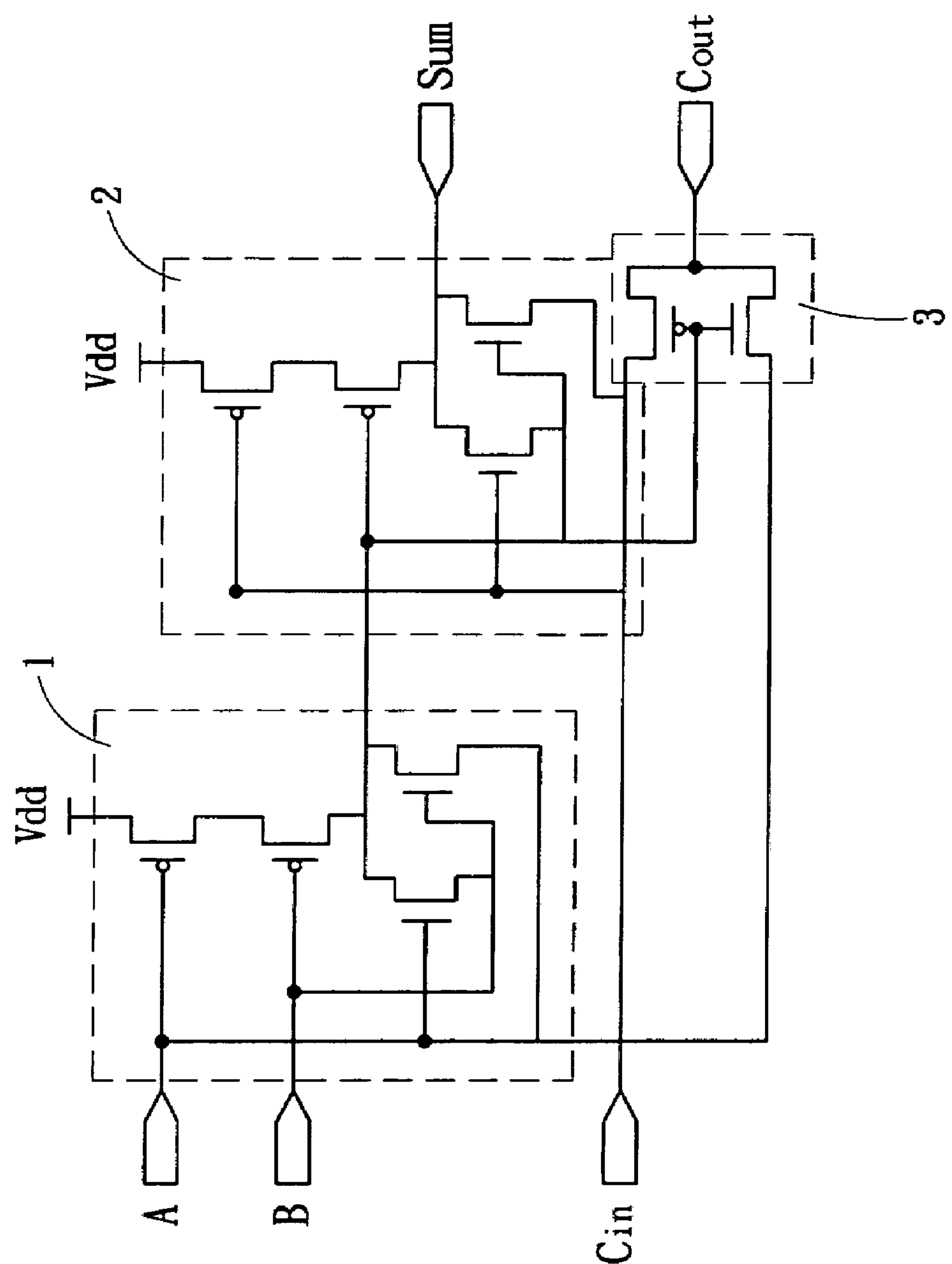
FIG. 1 is a schematic view of a static energy-recovery full-adder (SERF)

To make it easier for our examiner to understand the technical characteristics, objective and performance of the invention, we use a preferred embodiment together with the attached drawings for the detailed description of the invention.

Referring to FIG. 2 to a truth table applicable for all ten-transistor adders, the full-adder of a complementary carry logic voltage compensation in accordance with the present invention adopts a design with a complementary carry method, and thus the $\overline{C_{in}}$ (an inverted carry output at a previous level) is taken into consideration for inputting signals in the field. The select signal is produced after the primary XOR logic or XNOR logic is computed, and the select signal is a main control signal in a 10T circuit having the function of a data select line of a signal generator for the output result of a sum signal Sum and a carry signal Cout and designed with a XOR (A⊕B) logic or a XNOR (A⊙B) logic. In addition to the originally existed sum signal Sum and carry signal $C_{out}$ of the adder, the last field of the output signal also lists a carry inverted phase signal $\overline{C_{out}}$ required by the present invention.

A sum signal Sum of a primary XOR logic in accordance with the present invention is taken for example. If both inputted addend A and carry input Cin are low, the result of A⊕Cin in the selection will be 0, and our expected result of the sum signal Sum also will be 0 if the summand B=0, and the sum signal Sum will be 1 if the summand B=1. If both inputted addend A and carry input $C_{in}$ are high, the result of $A \oplus C_{in}$ will be 0 as described above. In other words, if the result of $A \oplus C_{in}$ is 0, then the result of the sum signal Sum can be obtained from the input signal of summand B. If the inputted addend A and carry input $C_{in}$ are not equal (which are high potential or low potential when they are different) such that the result of $A \oplus C_{in}$ is 1, the result of the sum signal Sum can be obtained from the carry inverted phase signal $\overline{C_{out}}$. Similarly, if the result of $A \oplus C_{in}$ selected in the table is 0, the electric potential or the carry signal $C_{out}$ can be obtained from the inputted addend A; and if the result of $A \oplus C_{in}$ selected in the table is 1, the electric potential of the carry signal $C_{out}$ can be obtained from the inputted summand B.

By the foregoing analysis, we can use a multiplexer to work together with $A \oplus C_{in}$ as a data select line, such that if $A \oplus C_{in}=0$, then the addend A will be selected for the output; and if $A \oplus C_{in}=1$, then the summand B will be selected for the output, so as to achieve the output circuit of the carry signal $C_{out}$. The carry inverted phase signal $\overline{C_{out}}$ uses an inverter to obtain a carry signal $C_{out}$, so that this inverter under the design of a pass transistor logic can recover the loss of output potential of the inverter, and the circuit of the present invention can effectively and simultaneously solve the two aforementioned problems of the serially connected sum output with the foregoing transmission method while maintaining the use of the same quantity of transistors (ten transistors).

Since the structure of the present invention requires an increased output driving capability and an enhanced speed for the serial connection, its circuit structure further needs a carry inverted phase input $\overline{C_{in}}$ and an inverted carry output ($\overline{C_{out}}$), in addition to the addend A, summand B, carry input $C_{in}$, sum signal Sum and carry signal $C_{out}$ of a general full-adder circuit, and this is the major characteristic of the circuit structure of the present invention.

After the foregoing analysis, the design of the present invention derives the algorithm for a basic full-adder into two formulas as follows:

$$\text{Sum}=(A \oplus C_{in})\cdot\overline{C_{out}}+(A \odot C_{in})\cdot B;$$

$$\text{Cout}=(A \oplus C_{in})\cdot B+(A \odot C_{in})\cdot A.$$

Figure 3:
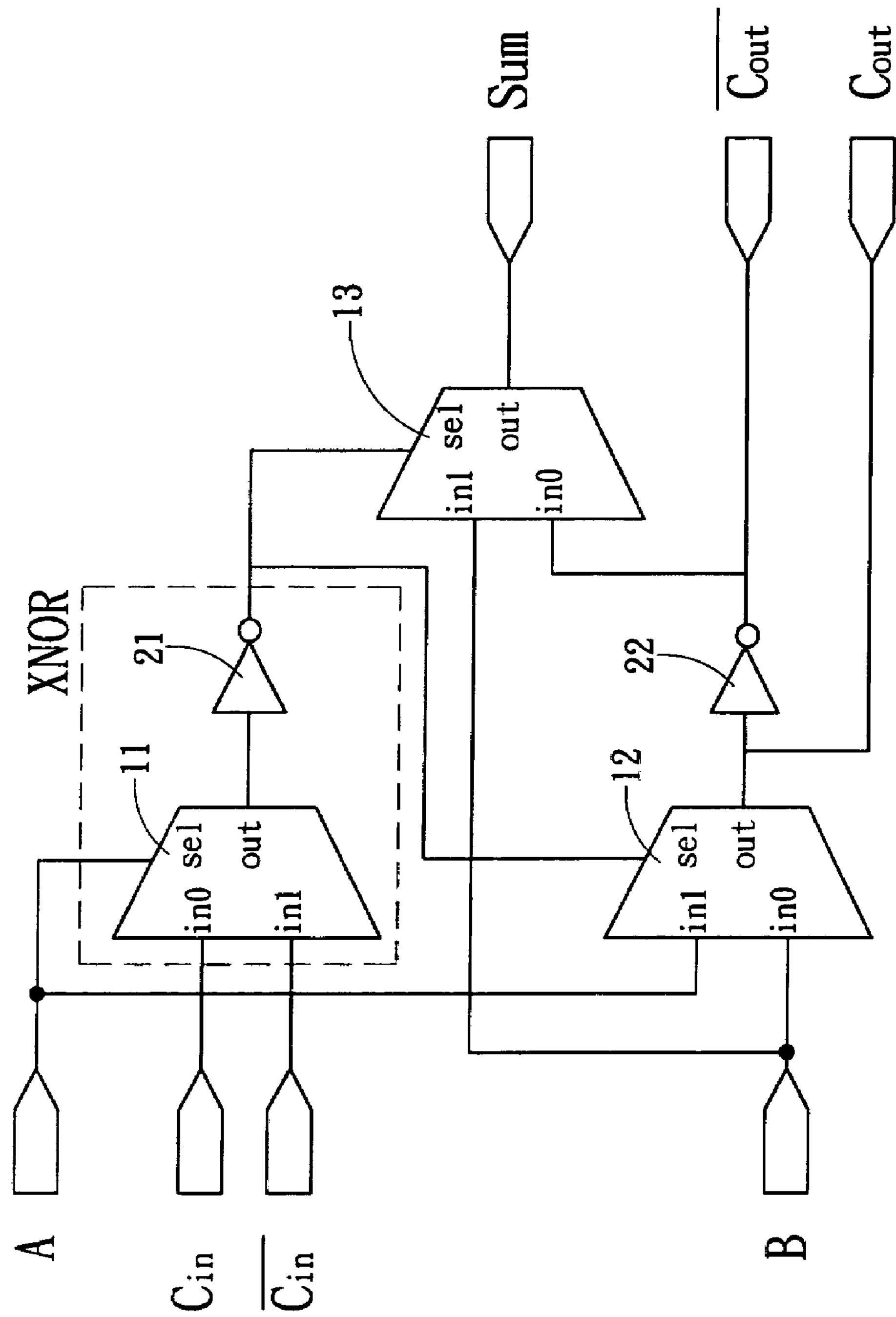
FIG. 3 is a schematic view of a structure of a full-adder in accordance with the present invention.

Referring to FIG. 3 for a structure of a full-adder of the invention derived from the algorithm, the full-adder of a complementary carry logic voltage compensation of the invention comprises: a first multiplexer 11 having two input terminals in0, in1 for inputting a carry input $C_{in}$ and a carry inverted phase input $\overline{C_{in}}$ respectively, and a select terminal se1 for inputting an add signal A; a first inverter 21, having an input terminal connected to an output signal of the first multiplexer 11; a second multiplexer 12, having two input terminals in0, in1 for inputting an addend A and a summand B respectively, and a select terminal se1 for inputting an output signal of the first inverter 21, and an output terminal of the second multiplexer 12 produces a carry signal $C_{out}$; a second inverter 22, having an input terminal connected to an output signal of the second multiplexer 12 produces a carry inverted phase signal $\overline{C_{out}}$; and a third multiplexer 13, having two input terminals in0, in1 for inputting the summand B and the carry inverted phase signal $\overline{C_{out}}$ produced by the second inverter 22 respectively, and a select terminal se1 for inputting an output signal of the first inverter 21, and an output terminal of the third multiplexer 13 produces a sum signal Sum.

The carry input $C_{in}$ is a carry signal $C_{out}$ outputted at a previous level, and the carry inverted phase input $\overline{C_{in}}$ is a carry inverted phase signal $\overline{C_{out}}$ outputted at a previous level.

The first, second and third multiplexers 11, 12, 13 only need to use a multiplexer composed of two transistors, wherein a PMOS transistor is used as a switch of the first input terminal in0 and an NMOS transistor is used as a switch component of a second input terminal in1.

If the first input terminal in0 of the first multiplexer 11 is connected to the carry input $C_{in}$, and the second input terminal in1 of the first multiplexer 11 is connected to the carry inverted phase input $\overline{C_{in}}$, an output signal of the first multiplexer 11 will be inverted by the first inverter 21 to form a XNOR logic circuit. The first input terminal in0 of the second multiplexer 12 is connected to the summand B, and the second input terminal in1 is connected to the addend A; the first input terminal in0 of the third multiplexer 13 is connected to the second inverter 22 to produce a carry inverted phase signal $\overline{C_{out}}$, and the second input terminal in1 of the third multiplexer 13 is connected to the summand B. The second inverter 22 and the third multiplexer 13 constitute another function similar to XNOR to obtain the sum signal Sum, while effectively recovering the potential by using the second inverter 22.

Figure 4:
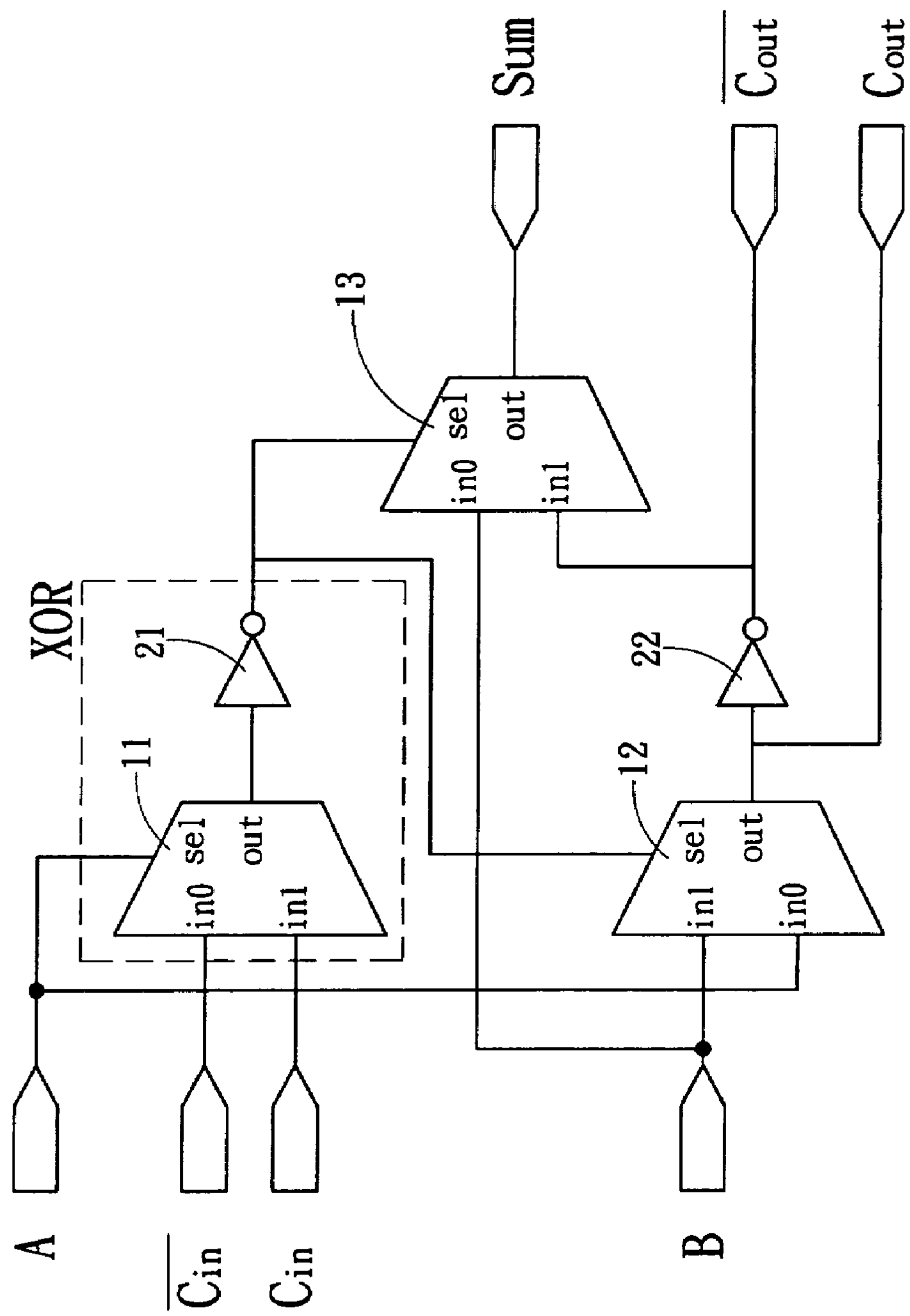
FIG. 4 is a schematic view of a structure of another full-adder in accordance with the present invention.
Figure 5:
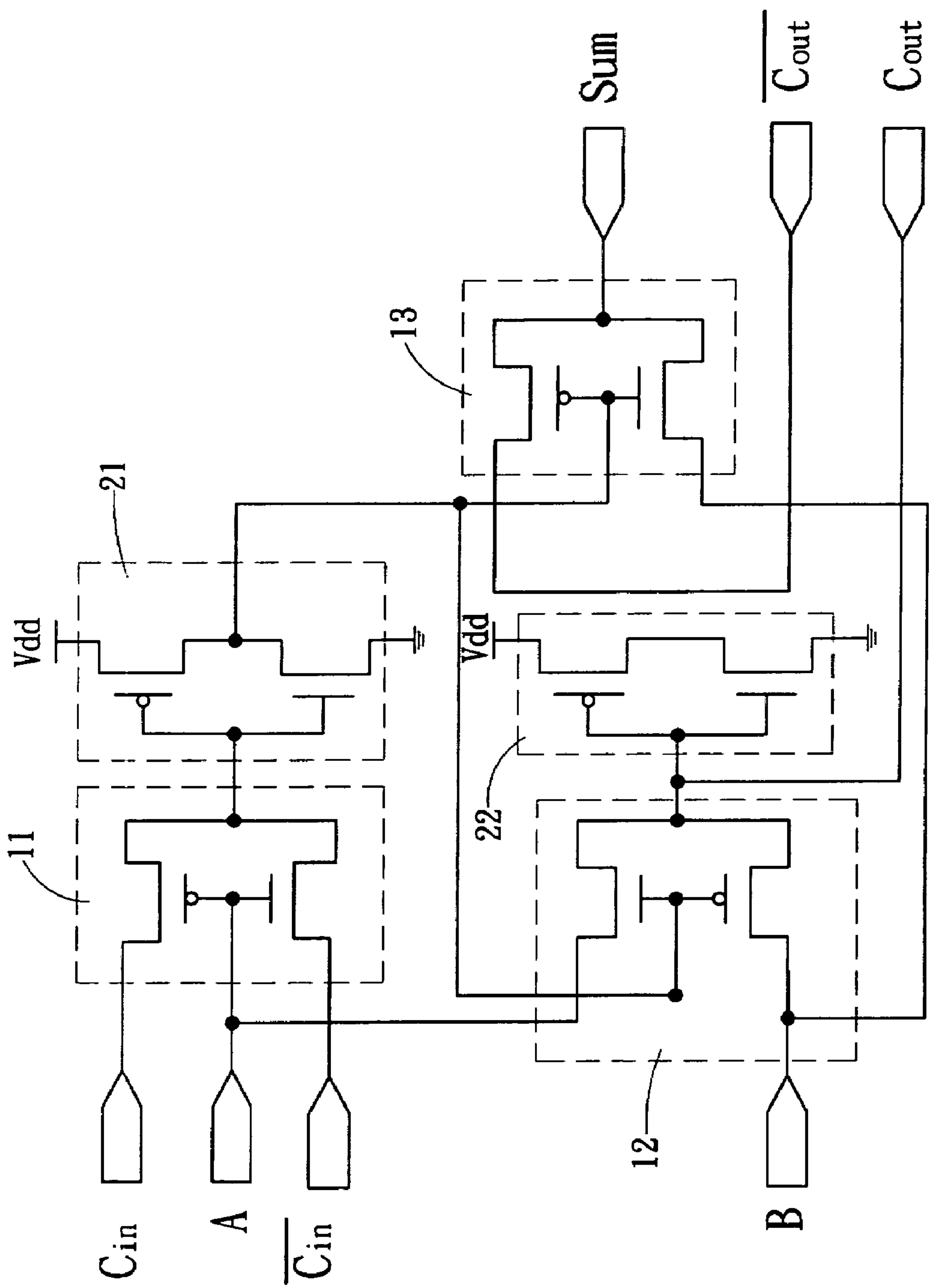
FIG. 5 is a circuit diagram of a ten-transistor (10T) full-adder based on the form of XNOR logic in accordance with the present invention.

Referring to FIG. 4 for a schematic view of a structure of another full-adder in accordance with the present invention, if a first input terminal in0 of a first multiplexer 11 is connected to the carry inverted phase input $\overline{C_{in}}$, and a second input terminal in1 of the first multiplexer 11 is connected to the carry input $C_{in}$, an output signal of the first multiplexer 11 will be inverted by the first inverter 21 to form a XOR logic circuit. A first input terminal in0 of the second multiplexer 12 is connected to the addend A, and a second input terminal in1 of the second multiplexer 12 is connected to the summand B; and a first input terminal in0 of the third multiplexer 13 is connected to the summand B, and a second input terminal in1 of the third multiplexer 13 is connected to the second inverter 22 to produce a carry inverted phase signal $\overline{C_{out}}$. Referring to FIG. 5 for a circuit diagram of a ten-transistor (10T) full-adder based on the form of XNOR logic in accordance with the present invention, the invention achieves a primary XOR/XNOR logic operation by using two input multiplexers to work together with a complementary carry signal, and the first multiplexer 11 uses an addend A to select its output result as a carry input $C_{in}$ or a carry inverted phase input $\overline{C_{in}}$. Since the circuit design of the present invention can produce a complementary carry output signal $C_{out}$, $\overline{C_{out}}$, therefore the input signal of the present invention has one $\overline{C_{in}}$ more than a general adder). The present invention only uses two transistors: a PMOS transistor and an NMOS transistor as the switch components of the input terminal to produce a primary signal (XOR/XNOR logic operation), and the remaining second and third multiplexers 12, 13 also use a multiplexer composed of only two transistors. After the first inverter recovers the outputted primary computation result, the gate transistor for outputting the final sum signal Sum and carry signal Cout is controlled. As to the potential, at most one Vt of the final output voltage potential is lost in the final sum signal Sum of the adder circuit of the present invention, and the same carry signal Cout loses at most one Vt, and another carry signal $\overline{C_{out}}$ outputs the potential signal perfectly.

On the other hand, the carry signal and the carry inverted phase signal of a multi-bit serial application of the present invention must be connected to the carry input and inverted carry input at a next level. In a critical path of a carry transmission of a full-adder composed of a multi-bit adder in accordance with the present invention, an alternate combination of multiplexer and inverter appears, and thus a possible serial connection issue of a pass transistor can be overcome by the inverter, and the Elmore delay problem of the disclosed 10T full-adder circuit structure can be improved significantly.

Compared with the circuit design of a traditional full-adder, the full-adder circuit structure of the invention has two major improvements as listed below:

Firstly, the circuit structure of the invention avoids using an electric potential with a voltage potential loss to control the transistor gate for finally producing the carry signal $C_{out}$ and the sum signal Sum, so as to prevent a multi-voltage potential loss of the output occurred in a general full-adder having a low transistor count as well as a drop of potential of the internal voltage signals of the circuit.

Secondly, the range of a serial connection of pass transistors is reduced to improve the transmission efficiency when the carry signal is transmitted. In the Elmore delay model, an increased delay of a transmission is proportional to the square of transistor counts connected in series. Therefore, a decrease of carry signals passing through the serially connected transistors in a transmission path will be helpful and beneficial to the serial connection application of a full-adder.

The full-adder of the present invention skillfully adopts a design of an inverter-based XOR/XNOR and uses the advantages of an inverter for recovering a potential and disconnecting an excessively long transmission path, while maintaining the use of ten transistors, so as to overcome the shortcomings of a low performance caused by a continuous loss of potentials and an excessively long transmission distance of other ten-transistor full-adders. Therefore, the minimum operating voltage in an application of a full-adder in accordance with the present invention can be reduced significantly from 2.8V to 1.9V (for the 0.35 um fabrication process) and the invention can overcome the multi-threshold lose problem occurred in other 10T full-adders. For advanced 0.18 um fabrication processes, the traditional circuits still require a voltage of 1.8V, but the invention can use a voltage lower than 1.15V, and thus a single battery can be used for such operation. In other words, a full-adder of the invention is more applicable for circuits operated at a low voltage than other ten-transistor full-adders, particularly for the circuits using a battery as the driving power.

The full-adder of the invention adopts an inverter-based XOR/XNOR having the aforementioned advantage of a low operating voltage and the inverter also has the advantage of a high driving capability. In other words, the speed of the full-adder of the invention is greater than the speed of other ten-transistor full-adders. Compared with other 10T adders, the performance of a full-adder composed of 8 bits to 16 bits in accordance with the invention can be improved by 5 to 10 times. As to the power consumption of a power-delay product (PDP) operated at a maximum operating frequency, the full-adder of the invention significantly leads other 10T adders. After the transistor count is normalized (PDP is divided by a multiple of the ten-transistor circuit), the invention is still better than other general adders designed with a higher transistor count of 28T, 20T, TGA, 16T and 14T etc.

The present invention provides a novel design of a ten-transistor full-adder circuit structure that installs an inverter circuit in the full-adder circuit structure without increasing the transistor count for reducing the loss of potential of the output signals of the ten-transistor full-adder, such that the original loss of two times of Vt can be reduced to one time of Vt to achieve the correct logic operation function. As to the serial connection, the circuit structure of the invention does not have a long serial connection of pass transistors in the critical path in a carry signal transmission, since the inverter in the circuit structure is situated precisely on the critical path of the signal transmission, and thus each signal transmission is followed by a connected inverter that can separate a direct transmission of a switch at a next level and recover the loss of electric potential of a switch at a previous level under a certain specific condition. Based on the Elmore theory, the total number of levels (N) of the serially connected switch and the number of overall serially connected levels are inserted according to the serially connected quantity (M) as compensation. The delay time of an enhanced inverter circuit will be reduced from the original N2 to N*M($1 \leqq M<N$) without considering the delay of speed of the inverter circuit, and thus the present invention can significantly improve the speed of a general traditional full-adder having a low transistor count in a multi-bit application.

The structural design of the invention provides a faster multi-bit adder for a high performance multi-bit adder circuit without incurring additional costs by using a minimum transistor count, and the design of a full-adder circuit of the invention is convenient and effective for various different applications.

While the invention has been described by means of specific embodiments, numerous modifications and variations could be made thereto by those skilled in the art without departing from the scope and spirit of the invention set forth in the claims.

What is claimed is:

1. A full-adder of a complementary carry logic voltage compensation, comprising:

a first multiplexer, having two input terminals for inputting a carry input and a carry inverted phase input respectively, and a select terminal for inputting an add signal;

a first inverter, having an input terminal connected to an output signal of said first multiplexer;

a second multiplexer, having two input terminals for inputting an addend and a summand respectively, and a select terminal for inputting an output signal of said first inverter, and said output terminal of said second multiplexer producing a carry signal;

a second inverter, having an input terminal connected to an output signal of said second multiplexer for producing a carry inverted phase signal; and a third multiplexer, having two input terminals for inputting said summand and a carry inverted phase signal produced by said second inverter respectively, and a select terminal for inputting an output signal of said first inverter, and said output terminal of said third multiplexer producing a sum signal.

2. The full-adder of claim 1, wherein said carry input is a carry signal outputted at a previous level, and said carry inverted phase input is a carry inverted phase signal outputted at a previous signal.

3. The full-adder of claim 1, wherein said first, second and third multiplexers use a PMOS transistor as a switch of a first input terminal and an NMOS transistor as a switch component of a second input terminal.

4. The full-adder of claim 3, wherein said first input terminal of said first multiplexer is connected to said carry input, and second input terminal is connected to said carry inverted phase input, such that an output signal of said first multiplexer is inverted by said first inverter to form a XNOR logic circuit.

5. The full-adder of claim 4, wherein said first input terminal of said second multiplexer is connected to a summand, and said second input terminal is connected to an addend, and said first input terminal of said third multiplexer is connected to said second inverter to produce a carry inverted phase signal, and said second input terminal is connected to said summand.

6. The full-adder of claim 3, wherein said first input terminal of said first multiplexer is connected to said carry inverted phase input, and said second input terminal is connected to said carry input, such that an output signal of said first multiplexer is inverted by said first inverter to form a XOR logic circuit.

7. The full-adder of claim 6, wherein said first input terminal of said second multiplexer is connected to said addend, and said second input terminal is connected to said summand, and said first input terminal of said third multiplexer is connected to said summand, and said second input terminal is connected to said second inverter to produce a carry inverted phase signal.

* * * * *